Figure 1:
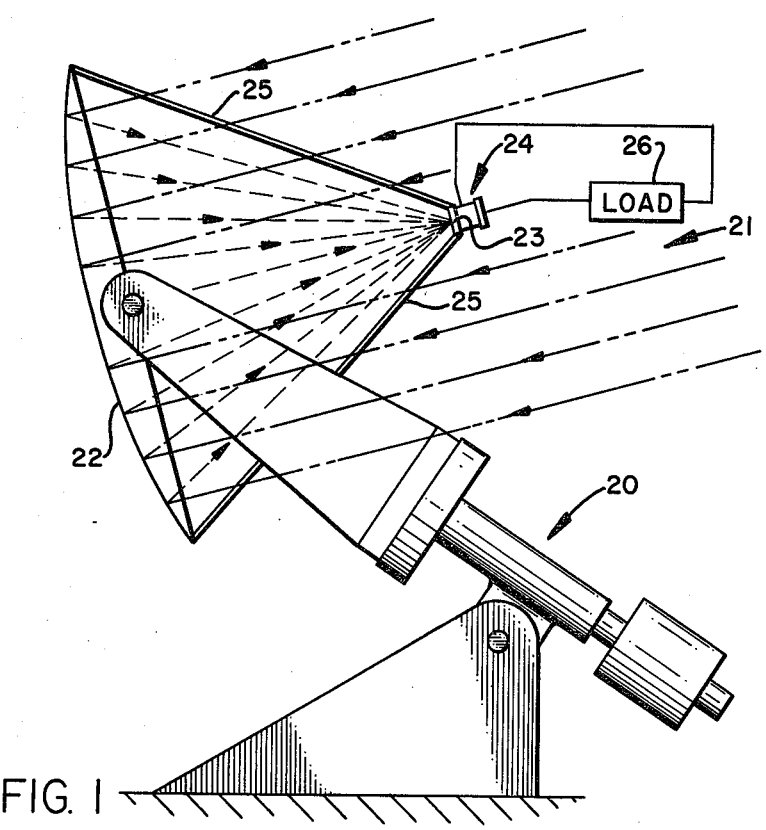

United States Patent [19]

Brunson

[11] 4,188,571

[45] Feb. 12, 1980

[54] RADIANT ENERGY TO ELECTRICAL POWER CONVERSION SYSTEM

[76] Inventor: Raymond D. Brunson, 9104 Joyce Phillips Ct., Springfield, Va. 22152

[21] Appl. No.: 721,800

[22] Filed: Sep. 8, 1976

[51] Int. Cl.² .................. H02N 3/00; H02N 7/00
[52] U.S. Cl. ............................ 322/2 R; 310/306; 313/211
[58] Field of Search .............. 322/2 R; 310/4 R; 313/211 R, 311 R; 250/211 R

[56] References Cited

U.S. PATENT DOCUMENTS

| | | | |
|---|---|---|---|
| 3,149,246 | 9/1964 | Mason | 310/4 |
| 3,176,164 | 3/1965 | Beggs | 310/4 |
| 3,462,310 | 8/1969 | Rubenstein | 310/4 X |
| 3,509,385 | 4/1970 | Psarouthakis | 310/306 |
| 3,551,727 | 12/1970 | Jensen et al. | 310/4 X |

Primary Examiner—Robert J. Hickey
Attorney, Agent, or Firm—Warren H. Kintzinger

[57] ABSTRACT

A radiant energy to electrical power thermionic conversion system using a transducer structure with very closely spaced cathode and anode elements in a vacuum to minimize space charge buildup and to optimize cross transfer of electrons from cathode to anode. The materials chosen are for a high work function high melt temperature cathode, tungsten for example with a work function of 4.52 volts, and an anode with a relatively low work function, typically a silver-oxide substrate with a coating of cesium as an anode face deposited on a copper heat sink conductor yielding, with the anode face, a work function approximating 0.75 volts.

23 Claims, 17 Drawing Figures

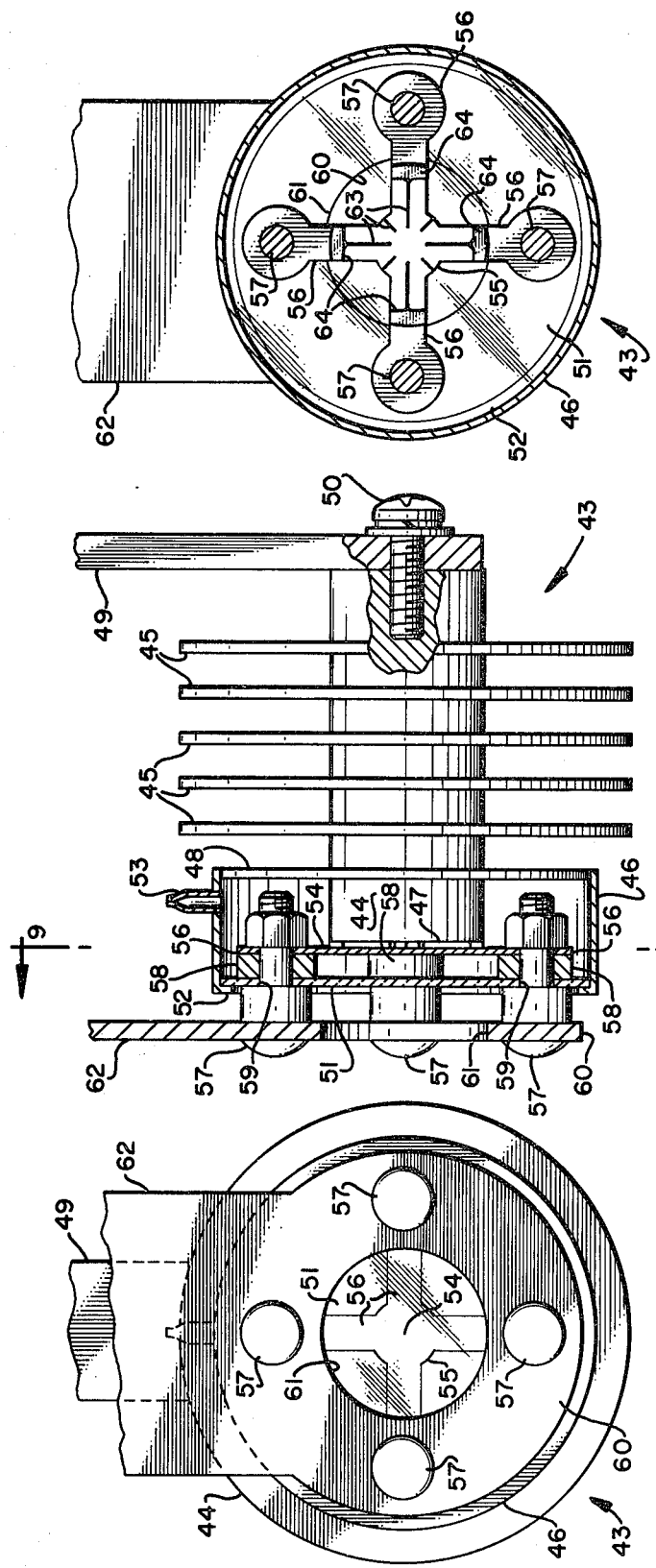

RADIANT ENERGY TO ELECTRICAL POWER CONVERSION SYSTEM

This invention relates in general to solar energy and, in particular, to highly efficient radiant-energy-to-electrical-power transducer equipped solar energy systems.

The recent energy crisis and fuel shortages have resulted in a considerable amount of attention being focused on energy, its availability and use. The primary reason for this is because it is finally being realized that energy ultimately determines the very life style of each individual with energy being a primary element determining financial systems, governments, and nations.

The two basic reasons for the increased attention on energy are supply and risk. Supply in the realization that the source, now being used most extensively, is not inexhaustible. In fact some nations are completely without oil except for imports; others import more than they produce; and finally, since the petroleum production cycle is not self regenerative, at some time in the future, all oil could be totally consumed. The other reason for increased attention, risk, is brought about by the realization of the threat to the environment and, in some cases, the possibility of catastrophic explosions by some energy forms. The residue from the combustion of coal and gasoline pollute the air and thermal and other wastes from nuclear energy pollute water in streams and rivers.

For the above concerns and reasons, it would be highly desirable to find another source of energy and the means to transduce, control, and to use it to replace and augment the energy supplies now in use. Such an energy source should not only alleviate the concerns expressed above, but also complete successfully with the advantages derived from the energy sources presently in use such as low cost, reliability, convenience, versatility, and efficiency.

Solar energy is much more available than any other form of energy. The radiation from the sun falls on every square foot of the earth's surface. The radiation intensity may vary with the declination angle of the sun, latitude, cloud cover, time of day, etc. However, these parameters only vary the amount of energy. The total supply is inexhaustible, or if not, there will be no need for energy. Further, there are no by-products of the solar process to pollute the atmosphere, and the process is not dangerously critical, such as to present explosion and/or radiation catastrophe problems.

Any product using electricity as an energy input is a suitable candidate for a solar energy to electrical energy conversion process and with highly efficient solar energy processing many products previously not designed for electric power may be changed to use electricity.

An efficient solar energy process can prove to be much more convenient than other energy sources in many areas. For example, if a building is heated by the solar process, it would not require delivery and, storage, and there would be no running out of fuel as there would be with coal and fuel oil. If an irrigation pump is needed in a remote location and it is desired to move the pump to different locations, the solar energy process would provide much more convenience than either an electric pump with energy supplied by the power company or an internal combustion engine driven pump. A power company would require distribution lines to each location with the exact site located, whereas, the solar process would be completely versatile to any location.

The internal combustion engine powered pump could be placed in remote locations, but would require the fuel to be replenished after a given time of use, while some solar energy process systems would be completely self-sustaining. Efficiency of systems has been a major parameter that has been used primarily in connection with size and temperature constraints. This is still the case and the new solar process compares quite favorably with other processes and it is especially true if the refining plant and storage areas for gasoline and the generating plants and transmission lines for elecricity are taken into account.

The cost of the basic supply for solar energy is free. The maintenance cost for the transducer is very low and life is extremely long, making the life cycle cost of the product very low. This makes the cost of this process much less than petroleum where there is cost involved in geo-physical exploration to find oil, cost of buying the oil from the owner; cost of drilling and pumping the oil; cost of transporting, storing and refining the oil; and the cost of distribution of the refined product. A similar analysis could be made for generating electricity by a power company. All of the above costs for petroleum would only add up to the fuel cost at the input to the power generation station. To this cost would have to be added the cost of the generating plant, transmission and distribution. Since the solar energy is available at the location of use, it is easily seen that solar energy is inherently cheaper than petroleum or commercial electricity.

It is, therefore, a principal object of this invention to provide highly efficient radiant energy to electrical power conversion transducers suitable for use in solar energy systems.

Another object with use of such energy conversion transducers in solar energy systems is to reduce dependency on other forms of energy.

A further object is to reduce polution and energy material hazard problems through use of applicant's relatively safe solar energy system.

Another object is to provide an energy power system placeable almost anywhere having minimal maintenance and substantially no supply requirements.

Any product using electricity as an energy input is a suitable candidate for a solar energy conversion process and with highly efficient solar energy processing many products previously not designed for electrical power may be changed to use electricity.

Still another object is to provide an energy source which can supply most household power demands, thus releasing that portion of the limited petroleum derived supply now used for power generation and heating for use in transportation or other fields.

Features of the invention useful in accomplishing the above objects include, in a radiant energy to electrical power conversion system, a transducer structure with very closely spaced cathode and anode such as to minimize space charge buildup and associated problems and to optimize cross transference of electrons from the cathode to the anode. The optimized temperature area of operation is quite high approaching the melting point of cathode material in the operating area thereof. This is accomplished with solar radiated energy concentrated by mirror or lens focused beams of energy to a high energy elevated temperature spot on the cathode of the transducer used in a thermionic conversion of solar energy to electricity. The process is very reliable with no moving parts in the solar energy transducer and with no process inherently unstable and self-destructive, such as thermal runaway in a transistor. The solar radiation driven process is a clean approach making use of the inherent properties of materials, relatively easy to control, and with life of components used in the thermionic process extremely long. The transducer is made up of the cathode, an anode, and a housing such as to permit a vacuum to exist between the cathode and anode with cathode materials selected for advantageous work functions and high temperature capabilities. A typical cathode material is tungsten with a work function of 4.52 volts and a melting temperature of 3653 degrees kelvin and an anode face opposite the cathode may be, for example, a silver-oxide base with a coating of cesium with this composite anode face affixed to a copper heat sink conductor. This provides an anode face work function of 0.75 volts. With the transducer the value of voltage is equal to the difference in voltage of the work function of the cathode and the work function of the anode.

Figure 2:
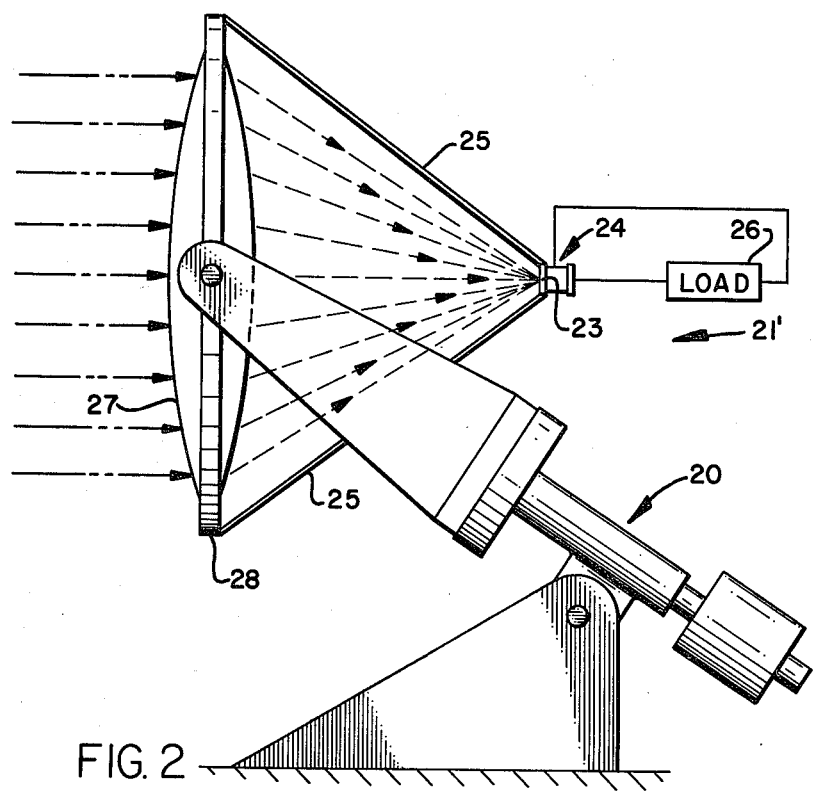
Figure 3:
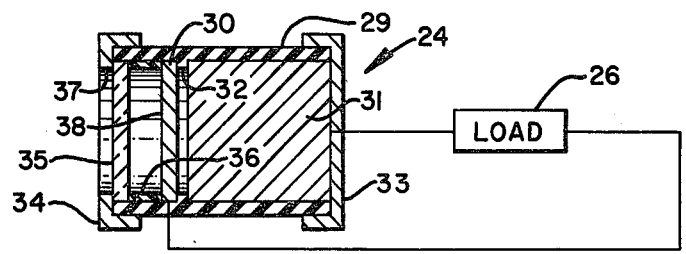
Figure 4:
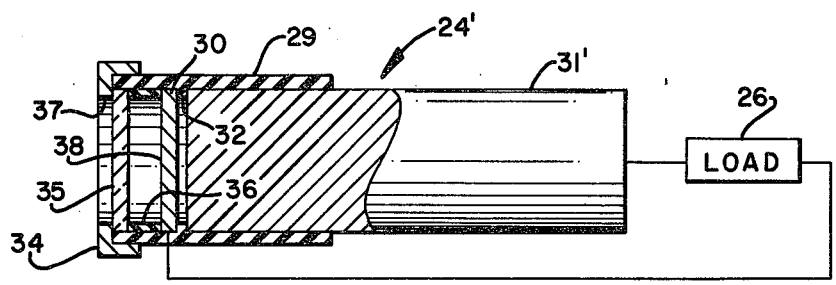
Figure 5:
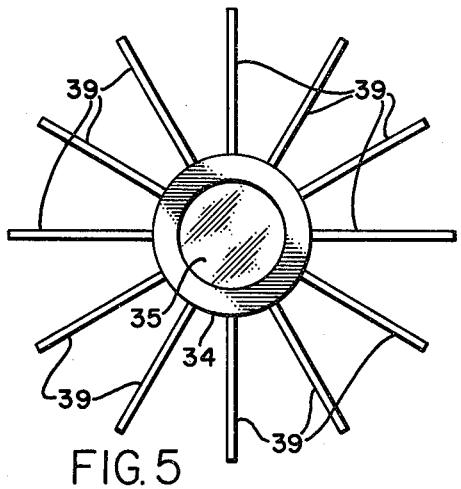
Figure 6:
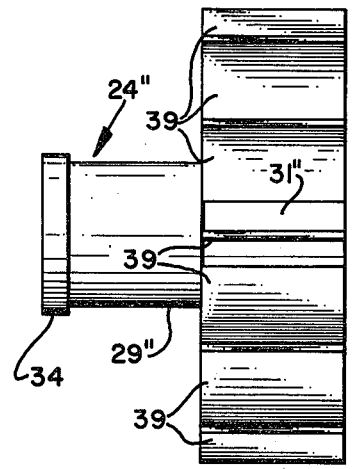
Figure 7:
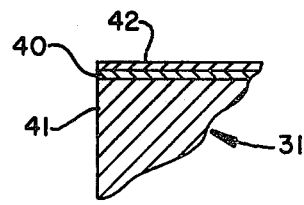
Figure 11:
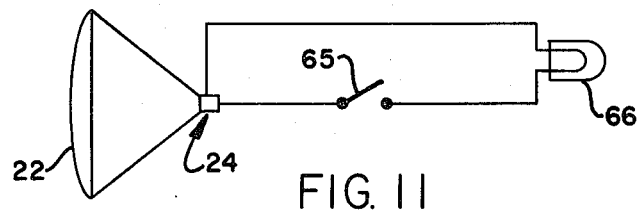
Figure 12:
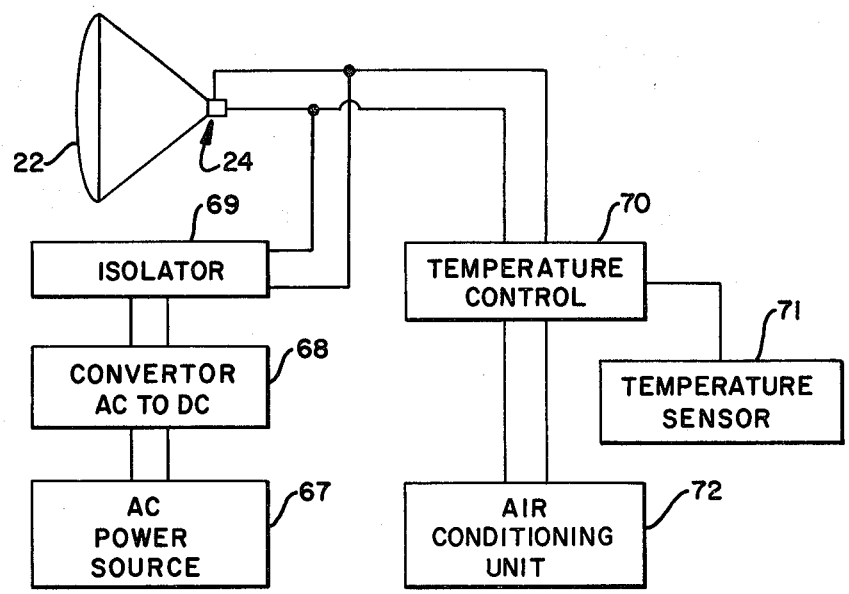
Figure 13:
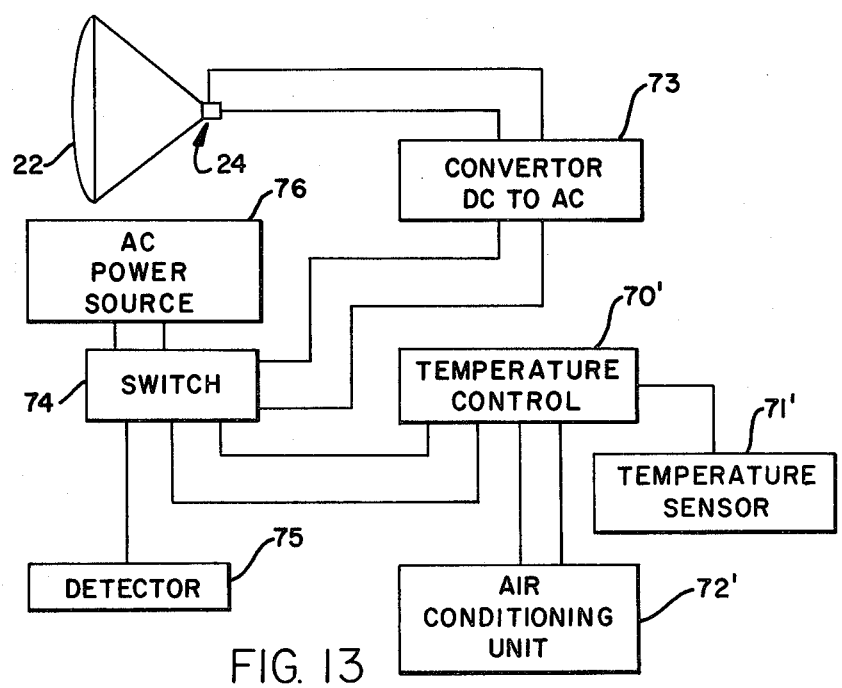
Figure 14:
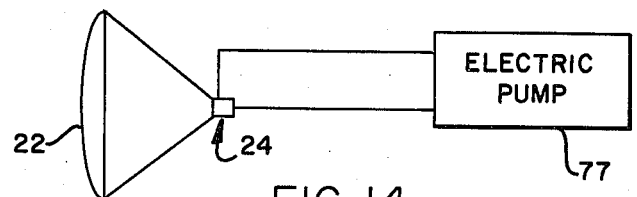
Figure 15:
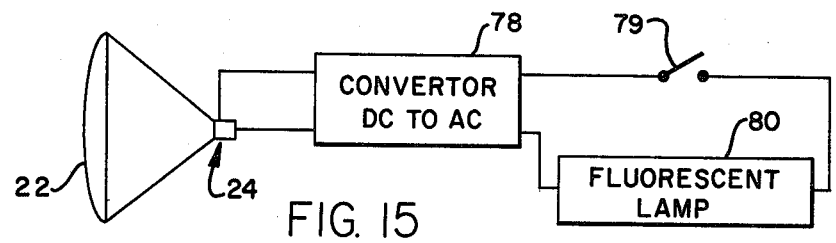
Figure 16:
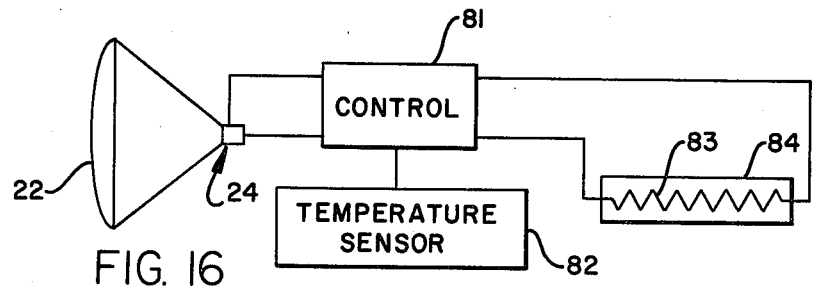
Figure 17:
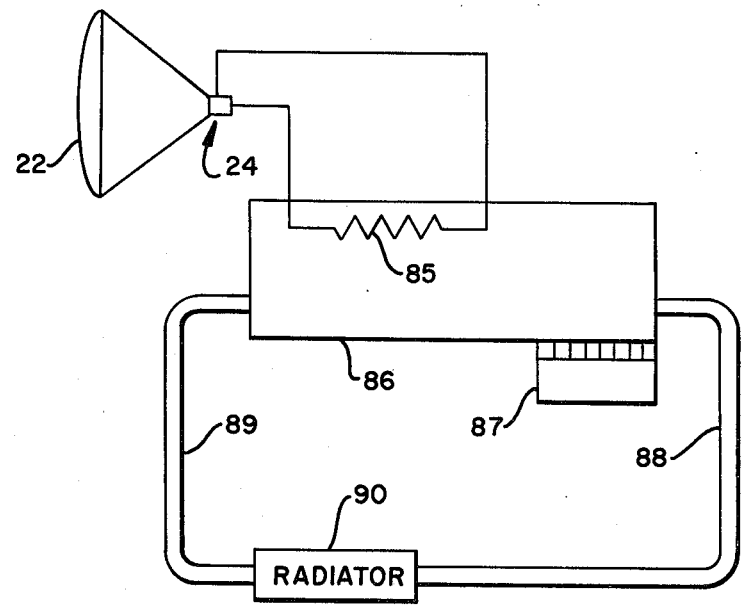

Specific embodiments representing what are presently regarded as the best mode of carrying out the invention are illustrated in the accompanying drawings:

In the drawings:

FIG. 1 represents a side elevation semi schematic showing of a solar to electrical power thermionic conversion system using a polar axis mounted reflective mirror solar radiation concentrator and transducer supplying electrical power to a load;

FIG. 2, a similar system using a lens in place of the mirror as a solar radiation concentrator;

FIGS. 3 and 4, cut away and sectioned showings of alternate transducer embodiments useable in the solar systems of FIGS. 1 and 2 circuit connected to using loads;

FIGS. 5 and 6, end and side views of yet another transducer embodiment with cooling fins projecting from the anode;

FIG. 7, a partial cut away and sectioned view of a section of the cathode facing end of an anode usable in the transducer embodiments of FIGS. 3, 4, 5 and 6;

FIGS. 8, 9, and 10, side elevation cut away section, a sectioned view on line 9—9, and the anode connector end view of another transducer;

FIG. 11, a schematic showing of a solar to electric power system with the load in the form of a light;

FIGS. 12 and 13, alternate air conditioning systems driven by solar thermionic conversion systems backed up by a conventional power supply system;

FIG. 14, a solar thermionic system driving an electric pump;

FIG. 15, a solar thermionic system powering a fluorescent lamp;

FIG. 16, a solar thermionic powered electrical radiant heating system; and,

FIG. 17, a solar thermionic powered electrical heater to boiler hot water heating system.

Referring to the drawings:

The polar axis mount structure 20 for a solar system 21 of FIG. 1, mounts a reflective dish 22 focusing solar radiation to a concentrated beam area impinging on the cathode end 23 of transducer 24. The support structure 20 is equipped to track the sun during daylight hours through appropriate articulation drive and control structure of a conventional nature (detail not shown) so as to keep the focused spot from migration out of the desired transducer 24 cathode operational area limits. Transducer 24 is mounted in proper focal position by mounting arms 25 attached to the rim of mirror dish 22, and is shown, schematically, to be electrically connected to a load 26.

The embodiment of FIG. 2, is much the same as that of FIG. 1, with however, a lens 27 mounted in rim 28 used in place of the mirror dish 22. Since the balance of the solar system 21 is substantially the same as with the embodiment of FIG. 1 the identification numbers are the same as well as the respective functions thereof.

The transducer 24 of FIG. 3, such as may be mounted in the solar system of FIG. 1 or FIG. 2 is shown to include a housing 29 enclosing a cathode 30 and an anode 31 in an evacuated environment with the cathode 30 and the anode 31 electrically connected to a using load 26. Housing 29 is generally cylindrical with an inner annular shoulder 32 acting as a spacer for the cathode 30 and anode 31 to insure close predetermined spacing between the cathode 30 and anode 31 of no more than 0.002 of an inch ranging down to as little as approximately 0.0002 of an inch. Housing 29 is equipped with a cap 33 holding the anode 31 in place snug against the anode side of shoulder 32, and also with a cap 34 holding a glass window disc 35 in place. Glass disc 35 is held in stacked assembly with cylindrical spacer 36 and cathode 30 against the cathode side of shoulder 32 by cap 34 that is provided with an opening 37 in order that the focused beam may shine through glass disc 35 and impinge on cathode face 38. The caps 33 and 34 are so sealed in assembly with the housing 29 as by sealants (not shown), or welds as to maintain vacuum in the space between the anode 31 and the cathode 30 and between the cathode 30 and glass disc 35. It is important that materials used in the housing 29 of transducer 24 be of electrical nonconductive material so as not to present an electric current shorting path between the cathode 30 and anode 31 with the external cicuit path through using load 26 being the useful circuit power output path.

The transducer 24' of FIG. 4 is much the same as with the embodiment of FIG. 3 except that the anode 31' is extended to the exterior of the housing 29' without a cap like cap 33 at that end for cooling purposes. It is important in the embodiments with anodes 31, 31' and in other embodiments that the anodes be like a heat sink so as to be much cooler at all operational time than the cathode of a transducer in order to optimize the thermionic action developed power output therefrom. The lines connected to and through load 26, in the embodiments of FIGS. 3 and 4, must obviously be of adequate current carrying capacity and have appropriate connections with anodes and cathodes, and have appropriate housing through wall provisions where passed through a housing wall to meet housing vacuum requirements through a high temperature operational range.

With the transducer 24'', of FIGS. 5 and 6, the extension of anode 31' beyond an end of housing 29'' is equipped with a plurality of radially extended cooling fins 39 to optimize cooling of the anode, particularly the anode face closely spaced from the cathode.

A typical cathode material usable for cathodes 38 is tungsten that has a work function of 4.52 volts and a melting temperature of 3653 degrees kelvin. The anode face opposite the cathode such as would be used on anode 31 or 31' and illustrated in enlarged fragmented sectioned FIG. 7 is a silver-oxide base coating 40 deposited on the anode copper heat sink conductor 41 and a top coating of cesium 42. Such an anode has a work function of 0.75 volts. The thermionic process to change the solar energy into electrical energy, in a solar system using a transducer 24 with such components, operates in the following manner: An area of solar radiation rays are concentrated into a small area on the cathode of the transducer. The transducer cathode material used allows electrons to escape its surface as its internal temperature is increased. These electrons are captured by the anode which is connected back by an electric current conducting circuit to the cathode. Since electrons are lost by the cathode and acquired by the anode with this process a potential difference E exists with the cathode being positive and the anode negative and if an electrical load is included in a circuit between the cathode and anode on electron stream of magnitude 1 will flow through it doing work.

The focused energy is directed onto one side of the cathode in a transducer 24 made up of the cathode, an anode, and a housing constructed to maintain a vacuum between the cathode and anode. On the basis of thermodynamic considerations advanced by Mr. V. Lane (1918) and Mr. R. C. Talman 1921), Mr. S. Dushman, derived an equation for thermionic emission as follows:

$$I = AT^2 E^{-b_0/T} \qquad \text{Equation 1}$$

where
 $A = 2\pi m_0 e k^2 / h^3$
 mo = rest — mass of the electron
 e = charge on the electron
 K = Boltzman constant
 h = Planck constant
 $b_o = 11605 \phi_o$
 $\phi_0$ = thermionic work function of any particular metal
 T = absolute temperature, deg Kelvin
 I = emission current, amp/square centimeter If the cathode is heated up by solar energy, the above equation will define the number of electrons (amount of current) that will leave the cathode. The two variables in the equation the designer has control of is the selection of the type of material that, determines the thermionic work function, and the size of the cathode which influences the magnitude of current. Other design parameters imposed on the cathode are material melting temperature, mechanical strength at elevated temperatures, and thermal expansion.

It is apparent that if the temperature is increased without limit in equation I, that the current would increase without limit. However, it is also apparent that at some temperature any material will melt and equation 1 has no meaning. Therefore when a cathode material is selected for current output, it must simultaneously be selected to be within or below its melting temperature.

Cathode to anode spacing is also important, but at this point it is only necessary to accept this and define the characteristics of the cathode that should be determined in order to accomplish it. Those characteristics are mechanical strength at high temperatures and thermal expansion.

It has been shown that the cathode emits a stream of electrons from its surface at elevated temperatures. However, since the presence of even a slight trace of residual oxygen and many other gases decreased the emission tremendously, an efficient high current output can be obtained only from well-cleaned surfaces and in vacuum of the order of $10^{-3}$ or less.

The actual value of the "space current", as it is often designated, between cathode and anode, in a good vacuum, is limited either by temperature saturation, see equation 1, or by anode voltage. As shown by Langmuir (1913) the space charge limited current for parallel plane surfaces is $$I_s = \frac{2.331 \times 10^{-6}}{d^2} V^{3/2} \qquad \text{Equation 2}$$

where
 I = curent in amp per square centimeter
 d = distance between cathode and anode in centimeters
 V = voltage between cathode and anode in volts In this transducer the value of V is equal to the difference in voltage of the work function of the cathode and the work function of the anode.

The distance between the cathode and anode, d in equation 2, is critical because by inspection it can be seen that space charge limited current varies inversely as the square of this quantity. Hereinbefore it has been pointed out that certain parameters should be selected for the cathode in order to control this distance. The same is also true for the anode even though it is not critical since it is at a much lower temperature.

The anode responds to equation 1 with its intrinsic values in the same manner as the cathode. However, the current from the anode will subtract from the current from the cathode, and cause a decrease in output current in a process called secondary emission. The design of the transducers is such that this secondary emission is reduced to a minimum by keeping the anode temperature as low as practical.

The primary sources of energy which can cause a rise in temperature of the anode is radiation from the cathode, energy used in overcoming work function of the anode, and the passage of current through the anode which causes an $I^2R$ loss. The design of the anode is such that the summation of the three energy sources can traverse the anode and be radiated to ambient temperature without causing the temperature of the anode to rise appreciably.

The value of the work function of the anode should be made as low as possible through selection of correct anode facing material. This is because this work function adversely affects the operation of the transducer in three ways:

First, since the V in equation 2 is equal to the work function of the cathode minus the work function of the anode, it reduces the magnitude of the space charge current.

Second, the usable output power from the transducer is equal to the voltage between the anode and cathode, V, times the electron current from cathode to anode. Since V is equal to the work function of the cathode minus the work function of the anode, it is apparent that the available output power is reduced by an amount equal to anode work function times the output current.

Third, the loss of power equal to the anode work function times the output current results in a temperature rise in the anode. If design precautions are not exercised to limit the amount of this temperatue rise, secondary emission will occur at the anode and decrease the magnitude of current output.

Using the design constraints, equations, and methods outlined in the preceding paragraphs, a typical unit was designed. The cathode material was selected as tungsten which has a work function of 4.52 volts and a melting temperature of 3653 degrees kelvin. The anode face opposite the cathode was made from a silver-oxide base with a coating of cesium. This composite face was affixed to a copper conductor. This anode has a work function of 0.75 volts. Using the above numbers and equations 1 and 2 simultaneously, the following data was derived
when
  Cathode—anode spacing=0.000247 inches
  cathode temperature=3630 degrees Kelvin
then
  output current=335.98 amps
  output power=1219.11 watts Next the unit was designed and input power determined so that the cathode temperature could be reached. The cathode is 0.287 square inch in cross sectional area and at 3630 degrees Kelvin as determined by the equations. This is 23 degrees Centigrade below the melting point of tungsten. When at temperature equilibrium, the cathode must absorb power equal to its power losses. These losses are radiation and conduction losses. There are no cathode conversion losses since the element is in a vacuum.

The first radiation loss of the cathode to be examined is to the anode. The anode is placed with a spacing of 0.000247 inches to the cathode and the secondary emission current is limited to 1% of the cathode current. This determines that the face of the anode nearest the cathode must be at most 662 degrees Kelvin, preferably less. All of the power absorbed by the anode comes from the cathode face by radiation. This power can be calculated by using the following equation $$P_{RAD} = \epsilon_1 A_c \sigma T_c^4 - \epsilon_2 A_A \sigma T_A^4 \qquad \text{Equation 3}$$

where
  $P_{RAD}$=Power exchanged cathode—anode (watts)
  $\epsilon_1$=Emissivity of cathode=0.3784
  $A_c$=Cathode face area (square inches)=1 sq. in.
  $\sigma$=Stefan's constant=$37.57154 \times 10^{-12}$/inch² °K.⁴
  $T_c$=Cathode temperature=3200 deg. Kelvin
  $\epsilon_2$=Emissivity of anode=0.78
  $A_A$=Anode face area (square inches)
  $T_A$=Anode temperature=715 degrees Kelvin This power is calculated to be 1330.1 watts and it is conducted thru the anode and dissipated to the ambient surroundings by convection and conduction.

The anode conduction coefficient, determined by the kind of material used, is 59.81 watts/inch/deg Kelvin. It is calculated that the anode must be 1.69 inches in diameter and 6.75 inches long in order to reach temperature equilibrium with the input face at 715 deg. Kelvin and a wattage input of 1330.1 watts. With these dimensions the temperature at the output face of the anode is 679 deg. Kelvin.

The anode has an electrical power output of 1378.6 watts, and a radiation input of 1330.1 watts. The electrical efficiency is defined as the available power from the cathode and equal to the output current times the cathode work function, minus the power loss in the anode in overcoming its work function, equal to output current times the anode work function, divided by the available power. This calculates to be 77.4%. Therefore the operating characteristis of the anode and the radiation losses of one face of the cathode have been determined.

Another power loss by the cathode is by conduction. The cathode is .05 inches thick and has a conduction coefficient of 16.55 watts/inch/deg. Kelvin. The sides of the cathode lose power by radiation to the ambient environment. Using this data is found that the temperature of the input face, the cathode face away from the anode, is 3204 degrees Kelvin and the amount of radiation input power necessary to take care of all losses to this point is 1596.8 watts. There are other losses at the cathode input face discussed hereinafter. However, it is convenient at this point, to describe some characteristics of the transducer since at some point in time it might be desirable to compare different transducers.

This transducer has an available electric power output from the cathode at a high voltage level resulting from a moderately higher wattage of radiated power input taking into account the losses described above. With such a transducer the output voltage, cathode only not including anode, is 4.52 volts and the measured output voltage, both cathode and anode, is 3.5 volts. The output current is 393.9 amps and the available power from the cathode is 1780.4 watts and the power loss overcoming the anode work function is 401.8 watts with a usable output power of 1378.6 watts. The electrical watts generated at the cathode per degree Kelvin is 0.556 and a high efficiency is attained on the conversion of radiation input power to cathode electrical power at this point.

The only other power loss by the cathode is at its input face and some methods may be implemented to reduce the magnitude of this loss. The cathode is contained by the housing in a vacuum.

The anode-cathode spacing in the thermionic solar to electric power transducers is a critical factor in achieving high efficiency through optimization, in the thermionic device, of two conditions as defined by two equations.

The first equation is for thermionic current limitation due to temperature saturation and is shown in equation 1A:

$$AMP_T = \frac{AT^2}{\epsilon^{\frac{11605 V_\omega}{T}}} \qquad \text{Equation 1A}$$

where
  $AMP_T$=Output Current (Amps/in²)
  $A = 2\pi M_o e k^2 / h^3$
  $\epsilon = 2.718281828459$
  T=Temperature (degrees Kelvin)
  $V_W$=work function of material (volts)
In the equation for A
  $M_o$=rest—mass of electron
  e=charge on the electron
  k=Boltzmann constant
  h=quantum constant (Planck's constant)

The second equation is for current limitation due to space charge and is shown in equation 2A:

$$AMP_s = \frac{15.03868 \times 10^{-6}}{d^2} (V_D)^{3/2}$$

where
  $AMP_s$=Output current (Amps/in²)
  15,03868=constant for parallel plane surfaces
  d=distance between electrodes (inches)
  $V_D$=voltage different between electrodes (volts)

When these two equations are solved simultaneously, it is found that d can vary from $25 \times 10^{-6}$ inches to $500 \times 10^{-6}$ inches for typical values of voltage differences and work function voltage.

This requirement for small distances and the tolerances associated with those distances create the followng problems:

(1) How to set, maintain, and control tolerances on the small distances.
(2) If spacers are used, how to insulate electrically between the electrodes.
(3) If spacers are used, how to minimize the power loss due to thermal conduction.

A solution to these problems is embodied in a process and materials.

First of all, spacers are used. The material for these spacers can be aluminum oxide or Hafnium oxide depending upon the operating temperature. Aluminum oxide can be used up to 2307 degrees Kelvin and Hafnium oxide can be used up to 3050 degrees Kelvin.

The space material is deposited upon the surface of either the cathode or the anode. This is done by using photographic masks and vacuum deposition processes. Using this process tolerances on thickness can be held to 20 to 30 angstrons, well within the tolerance requirement. This deposited spacer can be used to satisfy the significant problem of setting, maintaining, the distance between electrodes and controlling the tolerance on that distance.

Either Halfnium oxide or Aluminum oxide will satisfactorily electrically insulate the two electrodes at the high temperature required.

The power loss is minimized by controlling the width of the spacer. Power by thermal conduction is given by equation 3A shown below:

$$P = A(T/L) \, T/L$$

where
P = Power conducted (Watts) = Thermal conduction Coefficient
A = Cross sectional area
T = Temperature difference (°K.)
L = change in length As can be seen by inspection of the above equation, the only variable for a given set of conditions is cross sectional area, A. This cross sectional area is equal to the spacing between electrodes, which is set as described above, times the width of the spacer. Therefore, during the deposition of the spacer, if the width is controlled, the power loss will be controlled. It can be shown that $300 \times 10^{-6}$ inches or less for width of the spacer will limit the loss of power by thermal conduction to less than 0.1% of the electrical power output by the thermionic process.

The showing of the transducer 43 of FIGS. 8, 9 and 10, is more detailed than other transducer 24 embodiments with an anode 44, having heat radiation fins 45 to the exterior of vacuum housing 46. The anode 44 structure includes, typically a silver-oxide substrate coating on a copper heat sink body with an overcoating of cesium, such as the layered coating shown in FIG. 7, to yield a relatively low work function approximately 0.75 volts at the anode face 47. The copper heat sink body of anode 44 is inches long with housing closing wall 48 that is sealed in place closing an end of housing 46 as by welding (detail not shown) and extends back through the heat fin 45 area to the anode current buss 49 connection at the end as by screw assembly 50. The other end of housing 46 is closed by a glass 51, or other media highly transparent to the desired solar radiation energy, held in sealing pressure contact with the inside of housing flange 52. An alternate sealing of the glass 51 to the inside of housing flange 52 could be with a ceramic sealant (detail not shown) in order that a vacuum may be maintained within the housing 46 that is evacuated through evacuation tube 53. The cathode 54 contained within the evacuated chamber of housing 46 is a relatively thin body of high melt temperature high work function material such as tungsten approximately 0.04 inches thick with a center disc portion approximately ½ inch in diameter. Four radially extended current carrying mounting arms 56 extend outwardly from the center disc 55 to mounting stud and bolt assemblies 57 that with spacers 58 mount the cathode 54 at about 0.16 inches behind the glass disc 51. The stud and bolt assemblies 57 extend through openings 59 in the glass disc 51 to mount a current collector ring 60 to the exterior of housing 46. A center opening 61 is provided in the current ring 60 for unimpeded passage of focused radiant energy to the glass disc 51 and primarily through the glass to impingement on the radiant energy input side of the cathode 54. The current ring 60 with a current buss 62 stud and bolt assemblies 57, glass disc 51, and cathode 54 are so assembled as to be electrically insulated from direct shorting electrical contact with conductive material of housing 46 and from anode 44.

In order to facilitate desired close spacing between the cathode 54 and the face of anode 44 Hafnium oxide (or Aluminum oxide) spacer strips 63 are deposited on the anode side of the cathode 54 starting just outside the higher heat zone of the cathode center disc portion 55. The spacer strips 63 that are typically 0.0003 inches wide and 0.00024 thick extend radially outwardly and are so spaced as to substantially eliminate chance of shorting contact between cathode and anode. Further, spacer strips 63 extending radially outwardly on cathode arms 56 are shown to be provided with arm width widened outer end pads 64 to additionally insure nonshorting between cathode and anode.

Use of fused silica UV glass, or the substantial equivalent thereof, for housing glass disc 51 is quite effective in helping to reduce radiation losses at the cathode input face.

With a transducer constructed with the cathode inside a housing maintaining a high vacuum, solar radiation is concentrated into a beam and directed thru the housing onto the cathode. The energy in the beam generally has a predetermined distribution with solar wave directed onto the cathode $\lambda$ (min) $\cong$ 0.09 microns, $\lambda$ (max) $\cong$ 3.59 microns, and $\lambda m$ where maximum intensity of radiation occurs is approximately 0.5 microns. If fused silica UV glass, or equivalent, is used as the housing material this band of frequencies will be passed thru with only a 5% to 10% reduction. This transmitted wave heats the cathode up to a temperature of 2400° Kelvin to 3600° Kelvin. Exact temperature depends upon the cathode material and the thermionic current requirements. The hot cathode will in turn radiate energy following the same waveform distribution. However, now a shift has occurred in the frequency spectrum with $\lambda$ (min) is approximately 0.25 microns, $\lambda$ (max) is over 6 microns, and $\lambda m$ is approximately 1 micron. The fused Silica-uv housing absorbed a large part of this band of radiation. Whereas, when the solar wave passed through the Housing - 90% to 95% was transmitted through the housing, approximately 4% was reflected, and the remaining 1% to 6% absorbed; now with the radiated cathode heat wave-approximately 56% is transmitted through, 4% is reflected, and 40% absorbed. This absorbed energy will raise the temperature of the housing. By design the temperature to which the housing is raised can be controlled in the following manner. The losses from the housing are basically radiation and convection losses. They will follow the conventional equations for these losses. Equation A for Radiation and Equation B for Convection:

$$P_r = A\epsilon_H \sigma (T_H^4 - T_A^4)$$ Equation A where
 $P_r$ = Power radiated
 A = Area of radiation
 $\epsilon_H$ = Emissivity of Housing
 $\sigma$ = Constant
 $T_H$ = Temperature of Housing
 $T_A$ = Ambient Temperature $$P_{cv} = \gamma A (T_H - T_A)$$ Equation B where
 Pcv = Power of convection
 $\gamma$ = constant
 A = Area
 $T_H$ = Temperature of Housing
 $T_A$ = Ambient Temperature When the sum of these two losses equals the power exchange from the cathode to housing, temperature equilibrium is obtained. Also, the power exchange from cathode to housing is the only radiated power loss from the cathode input face. Therefore, as said in the initial paragraph, this loss should be minimized.

The equation for power radiated from the cathode is shown in Equation C:

$$P_c = A\epsilon_c \sigma T_c^4$$ Equation C where
 $P_c$ = power radiated from cathode to housing
 A = Area
 $\epsilon_c$ = Emissivity of cathode
 $\sigma$ = constant
 $T_c$ = Temperature of cathode The energy radiated back from housing to cathode is given by Equation D:

$$P_H = A\epsilon_H \sigma T_H^4$$ Equation D where
 $P_H$ = power radiated from housing to cathode
 A = Area
 $\epsilon_H$ = Emissivity of Housing
 $\sigma$ = constant
 $T_H$ = Temperature of Housing The energy exchanged from cathode to housing is obtained by subtracting equation D from Equation C. The results are given in Equation E:

$$P_{EXC} = A\sigma (\epsilon_c T_c^4 - \epsilon_H T_H^4)$$ Equation E

Inspection of the equation shows that the terms $\epsilon_c T_c^4$ and $\epsilon_H T_H^4$ are the dominating terms because of the fourth power. Also, inspection reveals the closer $T_H$ is to $T_C$, the smaller the power exchange. Therefore the design is performed to raise the temperature of the housing, as pointed out on page 3. This design makes use of the thermal conduction equation (Equation F).

$$P_{cond} = A_{cr} \lambda \frac{\Delta T}{\Delta L}$$ Equation F where
 $P_{cond}$ = Power of conduction
 $\lambda$ = Thermal Conduction Coefficient
 $\Delta T$ = change in temperature
 $\Delta L$ = change in length
 $A_{cr}$ = cross sectional area By selection of the right housing material, solar energy is passed through and heat radiated energy is absorbed. This absorbed power is the $P_{cond}$ in Equation F, the higher $\Delta T$ is for a given configuration and the $\Delta T$ value is given by Equation G:

$$\Delta T = T_{H-TA}$$ Equation G

Therefore $T_A$ or ambient temperature is a reference point, as $\Delta T$ increases the housing temperature $T_H$ will increase and as $T_H$ increases the power exchanged cathode to Housing will decrease.

Another independent variable in the equation is $A_{cr}$ or the cross-sectional area. This is not to be confused with Area. Area is the face area of the device and cross-sectional area is the area of material in the housing and is given by Equation J;

$$A_{cr} = T(2\pi R)$$ Equation J where
 $A_{cr}$ = cross sectional area
 T = Thickness of housing
 R = Radius at which thermal conduction calculation is needed.

Therefore by reducing the thickness of the housing the housing temperature can also be controlled.

Reduction of this process to practice, gives a housing material of Fused Silica-UV glass made by Corning Glass and a thickness of 0.394 inches. Other variations have the fused silica welded to other types of glasses with different thicknesses. This combination will allow the housing temperature to be controlled so that the power radiated is minimized. In fact, in the future, if a material can be found for the housing which has the above characteristics and a melting temperature equal to or greater than the cathode temperature, this power less loss can be reduced to a value approaching zero.

With the solar to electric power system of FIG. 11, the thermionic transducer 24 is supplying power through a line system with switch 65 to a lamp 66.

The solar to electric power system of FIG. 12 has a transducer 24 connected in parallel with an AC power supply 67, connected through an AC to DC convertor 68 and isolator 69, to supply power through a temperature control 70 employing a temperature sensor 71 for control of power to air conditioning unit 72.

With the alternate air conditioning system of FIG. 13, the DC power output of transducer 24 is converted to AC via convertor 73 and passed to a switch 74 controlled by a detector 75 for switching between the transducer supply power and power from alternate AC power source 76. These insure power supply through temperature control 70' as controlled by temperature sensor 71' for control of power to air conditioning unit 72'.

The transducer 24 in FIG. 14 is the power source for an electric pump 77.

In FIG. 15, transducer 24 is feeding DC to a DC to AC convertor 78 supplying AC to a switch 79 controlled power line system to a fluorescent lamp 80. The transducer 24 in the FIG. 16 system supplies DC through an on and off control 81, controlled by a temperature sensor 82, for an electric element 83 heater 84. Then with the system of FIG. 17, a heating element 85 in boiler 86, and when needed auxillary oil or gas heater 87, heats water in the boiler for distribution through heating system pipes 89 and 89 to and from a radiator 90 (or radiators) in an appropriate system.

Whereas, this invention is herein illustrated and described with respect to several embodiments thereof, it should be realized that various changes may be made without departing from essential contributions to the art made by the teachings hereof.

I claim:

1. In an energy to electrical power transducer for a radiant energy to electrical power conversion system; cathode means having a cathode face; anode means having an anode face; housing means structured to hold said cathode and anode faces as closely spaced faces of said cathode means and said anode means in a highly evacuated vacuum state; said cathode means being of high work function high melt temperature material; said anode being a relatively low work function material; with said cathode face and said anode face spaced no more than approximately 0.002 of an inch apart to minimize space charge buildup and to optimize cross transfer of electrons from cathode to anode in a thermionic conversion process; wherein said cathode means is a relatively thin flat member having said cathode face at one side and a radiation receiving face on a radiation receiving side with both said cathode face and said radiation receiving face held in a vacuum state within said housing means and with said cathode means of high work function high melt temperature material of the class including molyvdenum, niobium, and tungsten for cathode operation with radiant energy cathode means heating up into the range of approximately 2400° to 3600° Kelvin; and means for focusing solar radiated energy to a high energy elevated temperature spot on said radiation receiving face of said cathode means with said cathode spot area being substantially less than that of the face area of said cathode.

2. The transducer of claim 1, wherein said anode means is in the form of a heat sink of high thermal conductive rate material with a silver oxide coating at said anode face.

3. The transducer of claim 1, wherein Hafnium oxide cathode to anode spacing strips are deposited on said cathode face to a thickness of less than 0.001 inches.

4. The transducer of claim 1, wherein aluminum oxide cathode to anode spacing strips are deposited on said cathode face to a thickness of less than 0.001 inches.

5. The transducer of claim 1, wherein said anode has a heat sink body of high copper content with high thermal conductivity for conducting heat away from the anode face.

6. The transducer of claim 5, wherein said anode body extends from said anode face positioned within said housing means to the exterior of said housing means.

7. The transducer of claim 6, wherein said anode body is equipped with heat radiating fin means.

8. The transducer of claim 5, wherein said anode body includes fin wall means fastened in place as an end wall of said housing means enclosing a housing vacuum chamber.

9. The transducer of claim 8, including current buss connective means connectable to said anode body.

10. The transducer of claim 1, wherein dielectric material means forms part of said housing.

11. The transducer of claim 10, wherein electric circuit connective means connected to said cathode means is extended through said dielectric material means of said housing means.

12. The transducer of claim 11, wherein said cathode means is a relatively thin flat member of high work function high melt temperature material of the class including molybdenum, niobium, and tungsten; said cathode is formed with a high temperature portion having a radiation receiving input side upon which a spot of radiated energy may be focused and an electron thermionic emission side; and with said cathode input side and said electron thermionic emission side being spaced at close spacing relative to the lateral expanse area of the high temperature portion of said cathode means and to the area of radiated energy impingement on the high temperature portion of said cathode means.

13. The transducer of claim 12, wherein the input side and the electron thermionic emission side of said cathode high temperature portion are spaced approximately 0.04 of an inch.

14. The transducer of claim 12, wherein the input side and the electron thermionic emission side of said cathode high temperature portion are spaced less than one quarter of an inch.

15. The transducer of claim 12, wherein said cathode means is provided with lateral current carrying and mount arm means; and said electric circuit connective means is connected to said arm means.

16. The transducer of claim 15, wherein said dielectric material means includes a material section substantially transparent to focused solar radiant energy.

17. The transducer of claim 16, wherein said material section is made of fused silica U-V glass.

18. The transducer of claim 17, wherein said material section of fused silica U-V glass is approximately 0.4 inches thick in an area passing focused solar radiant energy.

19. The transducer of claim 18, wherein said electric circuit connective means is in the form of a plurality of conductive stud members extended through said glass; and a current ring connected to said plurality of conductive stud members outside of said housing means.

20. The transducer of claim 10, wherein said dielectric material means is in the form of material highly transparent to radiated solar energy and much less transparent to cathode emitted radiant energy.

21. The transducer of claim 10, wherein said dielectric material is fused silica U-V glass useful in achieving a housing greenhouse effect.

22. In an energy to electrical power transducer for a radiant energy to electrical power conversion system: cathode means having a cathode face; anode means having an anode face; housing means structured to hold said cathode and anode faces as closely spaced faces of said cathode means and said anode means in a highly evacuated vacuum state; said cathode means being of high work function high melt temperature material; said anode face being a relatively low work function material; with said cathode face and said anode face spaced no more than approximately 0.002 of an inch apart to minimize space charge buildup and to optimize cross transfer of electrons from cathode to anode in a thermionic conversion process; wherein said anode means is in the form of a heat sink of high thermal conductive rate material with a silver oxide coating at said anode face; and wherein said anode face is provided with a coating of cesium over said silver oxide coating to yield an anode face work function under approximately 1 volt.

23. The transducer of claim 19, wherein said cathode face and said anode face are substantially flat faces; and dielectric spacer means is positioned between said cathode and anode faces.

* * * * *